INVENTOR.
CHARLES I. PEDDLE
BY Arnold E. Renner

INVENTOR.
CHARLES I. PEDDLE
BY [signature]

United States Patent Office 3,435,191
Patented Mar. 25, 1969

3,435,191

TAPE START DETECTOR

Charles I. Peddle, Phoenix, Ariz., assignor to General Electric Company, a corporation of New York Filed Dec. 28, 1964, Ser. No. 421,417
Int. Cl. G06k 7/00; G11b 5/00
U.S. Cl. 235—61.11 2 Claims

ABSTRACT OF THE DISCLOSURE

A tape transport for automatically sensing the beginning of data on a punched tape by inhibiting signals corresponding to the tape leader sprocket holes until the occurrence of a data signal represented by an additional hole.

The present invention relates generally to transport devices and more particularly to a perforated tape transport system including means for automatically sensing the start of information on the tape and for enabling the transfer of this information.

One type of storage medium used, for example in electronic data processing, is commonly called punched or perforated tape. This storage medium is normally comprised of an elongated member, of suitable material such as paper, into which is punched a number of holes. These holes may be divided into two groups or pluralities. The first of these groups comprises a column of holes, equally spaced, extending substantially the full length of the tape. These holes are commonly called the sprocket holes. The second group of holes may be considered as forming a plurality of rows arranged perpendicularly to the length of the tape. Each of these rows is in alignment with a sprocket hole. The holes of the second group are normally referred to as information or data holes and each of the rows represents a coded information or data character; the particular coded character so represented being determined by the number and particular location of the holes within the row. In many systems, the absence of any hole, excepting the sprocket hole which is always present, is a valid data character.

In reading punched tape, an apparatus is provided which advances the tape past a suitable reading head which senses the presence of holes within the tape and provides signals corresponding thereto. In slower speed reading machines or systems, the sprocket holes serve a dual function. The first of these functions is that, through a suitable sprocket drive mechanism, these holes are utilized to advance the tape past the reading head. The second function served by these holes is that of synchronizing or timing the utilization of data signals from the reading head. This timing is achieved by assuring that a sprocket hole is aligned with each row of data character holes. The sprocket hole is sensed and a signal is generated corresponding to the spricket hole. This sprocket hole signal is then utilized in appropriate logic circuitry to enable the transfer of data hole signals to the utilization means. In higher speed machines, the actual feeding of the tape may be accomplished solely by frictional means; e.g., a rotating capstan and a pinch roller which maintains the tape in contact with the capstan. In this situation, the sprocket holes serve the single function of timing.

The sprocket holes are normally formed in the tape during the same punching operation in which the data holes are punched and serve to facilitate feeding of the tape during that operation. These holes are, therefore, present throughout the length of the tape and no information or data holes are punched until such time as a sufficient length of tape has been punched with only sprocket holes to form a leader. This leader is simply a length of tape which allows the operator to thread the tape from its storage reel, across the reading head, to a second storage or take-up reel.

As has been stated, the sprocket hole alone may represent a valid data character. Inasmuch as the leader, which actually does not contain any information, contains sprocket holes along its full length, some system or method is necessary to prevent the signal utilization means from interpreting leader sprocket holes as data characters.

The most common prior art method of preventing the leader sprocket holes from being interpreted as a data character was for the operator to thread the tape from its supply to its take-up reel, via a suitable read head, and then hand wind the tape until such time as the first row of data character holes was in an operative relationship with the read head. At that time, the machine is started and the data reading and transfer function is begun. While this method, in the hands of a skilled operator, is satisfactory from most standpoints, it is necessarily one which requires a fairly large amount of time. Additionally, in the hands of a new or unskilled operator, or if there exists some slight misalignment within the machine with which the operator is not familiar, it is possible that the data holes may not be properly positioned and a data character may be missed or a sprocket hole, which forms only a part of the leader, may be read as a data character.

It is, therefore, an object of the present invention to provide a perforated tape system including means to automatically indicate the beginning of data characters on the tape.

It is a further object of the present invention to provide an improved tape transport system including means to initiate the transfer of data from a punched tape.

Still another object is to provide, in a perforated tape system, an improved means for determining beginning of information holes or perforations and for automatically effecting the transmittal of signals corresponding to these perforations to a utilization means.

Briefly stated, the present invention provides a perforated tape system including means for transporting the tape past a suitable reading head which is capable of generating electrical signals in response to the perforation configuration on a particular area of the tape. One of the signals so generated corresponds to the sprocket hole while the remaining signals designate the presence or absence of data information holes. The system of the present invention further provides that the signal representing the sprocket hole is blocked from a signal utilization means until such time as there is a coincidence between this signal and a signal representing one of the data holes. Upon this coincidence, the signals representing both the sprocket hole and the data holes are transmitted to the signal utilization means. This blocking and subsequent unblocking of the transmission of signals is achieved through suitable gating logic.

Further objects and advantages of the present invention will become apparent as the following description proceeds and features of novelty which characterize the invention will be pointed out in particularity in the claims annexed to and forming a part of this specification. For a better understanding of the present invention, reference is made to the accompanying drawings in which:

Figure 1:
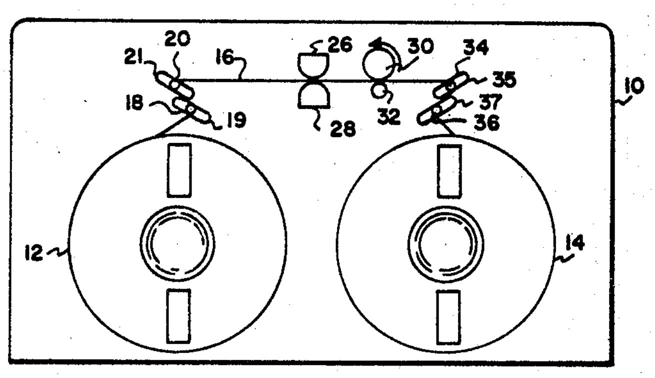
FIG. 1 is a view in front elevation of a tape transport panel showing the relationship between the tape storage means, the tape motion effecting means and the reading head.

With reference now to FIG. 1, there is illustrated an apparatus such as might be utilized with the present invention. As shown, there is provided a panel 10 upon which the remaining components of the apparatus are mounted. Positioned on the panel 10 are two storage means which may be in the form of reels 12 and 14. Disposed upon the reels 12 and 14 is a quantity of storage medium which, in the present invention, is an elongated tape 16 passing between the two reels 12 and 14. In so passing, the tape 16 is wound over a first pair of rotatable posts 18 and 20 which are resiliently biased and respectively movable within a pair of slots 19 and 21. The posts 18 and 20 buffer tape shock and vibration particularly during the starting and stopping of the tape as is well known in the art. From the post 20, tape 16 passes a reading head assembly 26, 28, through a drive assembly including a capstan 30 and a pinch roller 32, and onto a second pair of rotatable posts 34 and 36 having, respectively, associated slots 35 and 37. The design and function of the posts 34 and 36 and the slots 35 and 37 are essentially identical to that described with respect to those similar items positioned near the reel 12.

It is the purpose of the above-described apparatus to move the tape between parts 26 and 28 of the reading head assembly so that information which is contained on the tape may be read therefrom. In order that this information transfer may be properly accomplished, it is the requirement that the tape pass the reading head assembly 26, 28 at a uniform rate of speed. To provide this movement, the capstan 30 is rotated at constant speed in the counterclockwise direction. (Capstan 30 and reels 12 and 14 are given rotary motion through suitable motor drive means which have not been shown but which may be any of those which are well known in the art.) When it is desired to move the tape, pinch roller 32 associated with the capstan 30 is actuated by suitable means not shown such that it acts to maintain the tape in frictional engagement with the rotating capstan 30.

The foregoing discussion has been for the purpose of providing a suitable environment for the present invention and is intended to be illustrative only and not by way of limitation. For example, the above-described apparatus is one which is capable of reading punched tape at a relatively high rate of speed. Thus, the particular motion providing means of the rotating capstan and pinch roller have been provided. It is equally common, in the field of perforated tape readers, that the mechanism which advances the tape past the reading head includes a sprocket wheel having teeth which engage the sprocket holes within the tape. These, however, are generally slower machines than that which was described with respect to FIG. 1.

Several reasons exist, therefore, for the presence of the sprocket holes in a perforated tape. The forming of the sprocket holes, during the data punching operation, to facilitate tape advancement has been previously discussed. It is also seen that the presence of the sprocket holes allows the use of the same tape on either sprocket or friction drive machines. And, because the sprocket holes are accurately aligned with the data holes, they provide a convenient facility for effecting the timing or synchronization of data transfer.

Figure 2:
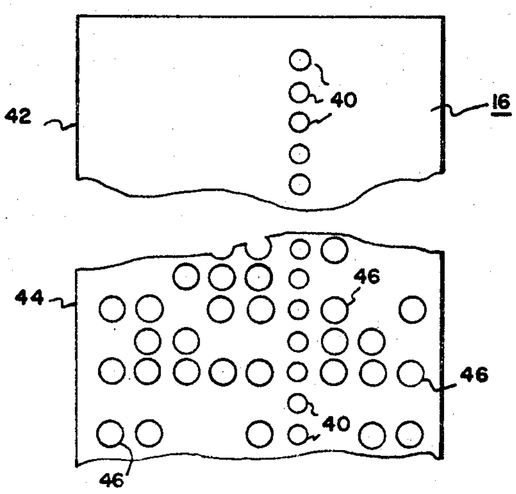
FIG. 2 is a fragmentary view of a piece of perforated tape illustrating both the leader portion in which only the sprocket holes are punched and the information portion in which both information and sprocket holes are punched; and, FIG. 3 is a schematic diagram illustrating a portion of the electronics of a tape transport system and embodying the gating logic of the present invention.
Figure 2:
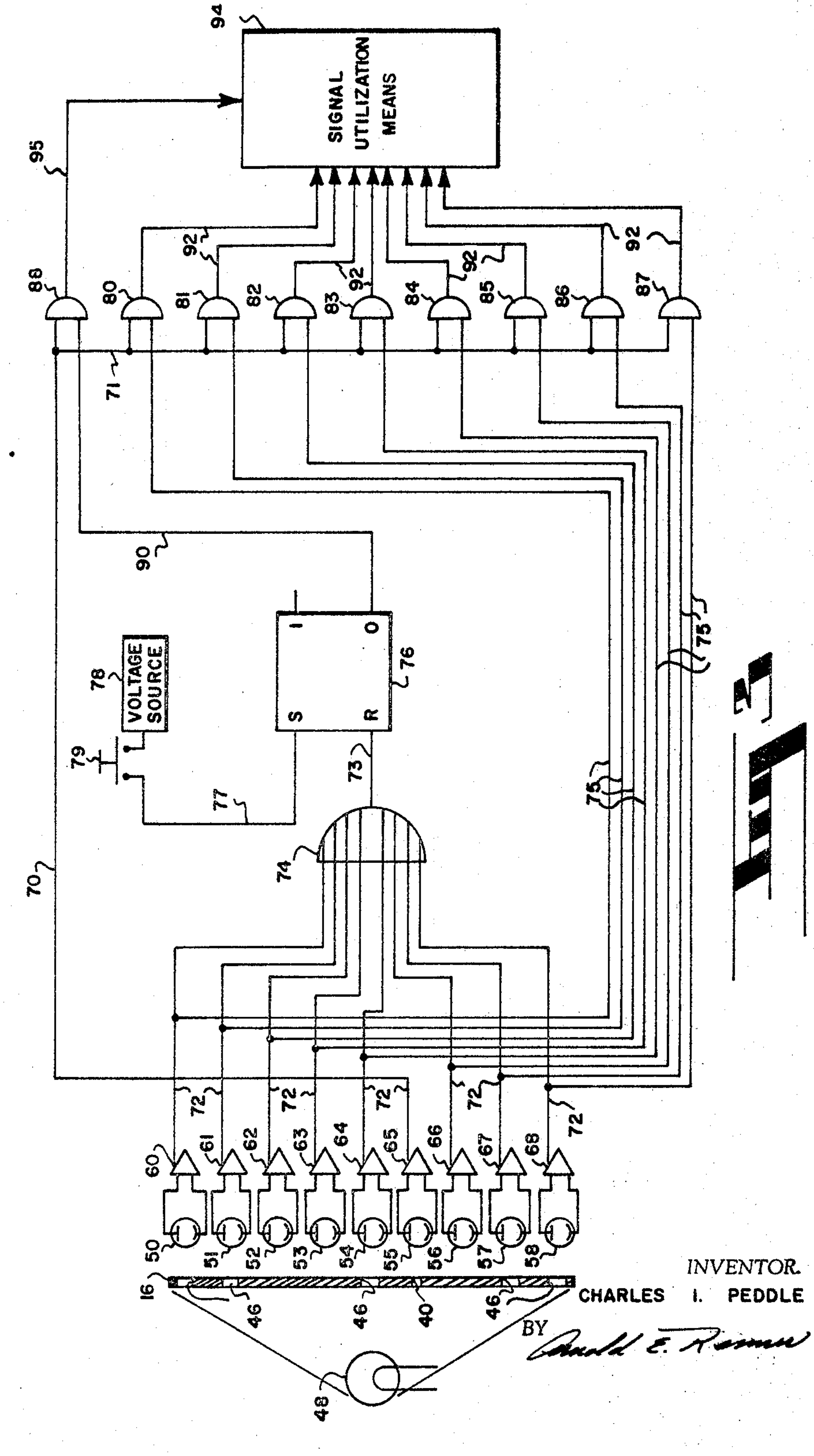

FIG. 2 illustrates a general format of a perforated tape such as might be utilized in the implementation of the present invention. The tape 16 may be made of any suitable material, for example paper or thin flexible plastic, and will normally have a width in the range of from ½ to 1 inch. While the length of the tape 16 will be determined by a number of factors including the physical capabilities of the apparatus upon which the tape is used, one common tape length is one thousand feet.

As viewed in FIG. 2, the break divides the strip of tape 16 into two portions or segments. The upper segment, designated 42, represents leader which would be of sufficient length to permit the threading of the tape between the two reels 12 and 14 (FIG. 1). This leader contains only sprocket holes 40 which are not intended to represent data characters. The lower segment of tape, designated 44, represents the coded information bearing portion of the tape. It is seen in FIG. 2 that the segment 44 also contains sprocket holes which, as has been stated, extend the full length of the tape. The information bearing tape portion 44 is also provided with a second plurality of holes 46, the presence and configuration of which represent data. The holes 46 are normally positioned in rows which are horizontally aligned with the sprocket holes 40 and each horizontal line of holes (or the absence thereof) represents one data character. It is noted that there are no data holes 46 associated with the next to last sprocket hole shown in the segment 44. Such a configuration, in most systems, represents a valid data character. Thus, while it has been stated in the discussion thus far, the position of the data holes 46 represent information characters, this statement should not be given a strict literal interpretation. In actuality, it is the combined configuration of presence or absence of holes which represent the data character.

From the previous discussions it is seen that a considerable length of tape 16, having only sprocket holes, may be provided as leader. Moreover, as has been stated, sprocket holes are also necessary in that portion of the tape containing information to provide a timing or synchronizing function. The problem therefore presented is one of determining the exact point at which data is begun on the tape and for providing some means for rendering ineffective the signals representing the leader sprocket holes, i.e., on that portion of the tape containing no data. The present invention, whereby this function is accomplished, is best understood with respect to FIG. 3.

Before proceeding with a description of FIG. 3, however, it is considered advantageous to define several of the terms to be used in that discussion. Frequent reference will be made to voltages or signals. While the electrical signals utilized in the operation of the system of the present invention will be of some particular magnitude, they will, in the subsequent description, be referred to merely as high level signals and low level signals. It will also be assumed that the output of all light sensitive devices is at a high level when irradiated by light and at a low level when not so irradiated.

Additional terminology to be used in the subsequent discussion includes an AND-gate, OR-gate, and flip-flop. An AND-gate is defined as a multiple input, single output device. All inputs to an AND-gate must be at the high level in order for the output to be at a high level. Should any of the inputs to the AND-gate be of a low level, the output of the AND-gate will be a low level output. An OR-gate is defined as a multiple input, single output device which provides a high level output upon the application of a high level signal to any one of its inputs.

A flip-flop is defined as a device having two stable states of operation. As utilized in the subsequent discussion the flip-flop has two input terminals, a set (S) and a reset (R) terminal, and two output terminals, a one terminal and a zero terminal. When high level signal is applied to the set (S) terminal of the flip-flop, the one output terminal is at a high level and the zero output terminal is at a low level. The flip-flop will remain in this state until a high level signal is applied to the reset (R) terminal of the flip-flop, at which time the one output terminal will switch to the low level and the zero terminal to the high level. The flip-flop will now remain in the reset state until such time as a high level signal is applied to the set (S) input terminal.

In any punched tape system, some means must be provided for sensing the presence of the holes within the tape. While a number of schemes are available for this purpose, including mechanical fingers which make electrical contact through the holes as the tape passes beneath the fingers, perhaps the most common method of achieving this purpose is by projecting a light through the holes from one side of the tape and providing a means on the opposite side of the tape for sensing this light. This particular scheme for sensing the presence of holes within the tape is illustrated in FIG. 3.

With particular reference now to FIG. 3, there is shown a perforated tape 16 having disposed, on one side thereof, a light source 48 which projects light through holes existing within the tape. On the side of the tape opposite the light source 48 are positioned suitable light sensing means 50–58 for detecting the light from the source 48 as it passes through the holes in the tape 16. The sensing means 50–58, one for each possible hole position, are illustrated as being photocells. The exact nature of these sensing elements 50–58 is not of prime importance and they may be photovoltaic, suitably biased photodiodes or any other light sensitive device capable of providing a change in electrical characteristics upon the exposure to light. Relating this configuration to FIG. 1, the light source 48 and the light sensitive means 50–58 would together constitute the reading head assembly 26, 28. That is, the light source 48 might be located in part 26 and the light sensitive elements 50–58 located in part 28. The electrical output from each of the sensing elements 50–58 is supplied respectively to suitable amplifiers 60–68. The outputs of the several amplifiers are electrical signals which collectively represent the data character recorded at that particular area of the tape 16.

The particular hole configuration in the tape 16 which is illustrated in FIG. 3 corresponds to the last line of holes shown in FIG. 2. Reading respectively from left to right in FIG. 2 and from top to bottom in FIG. 3 it is seen that data holes 46 are present in what may be considered the first, second, fifth, eighth and ninth positions. The sprocket hole 40 is present in the sixth position. (It should be noted at this time that the particular tape size here being described is merely illustrative and that a tape of a greater or lesser number of possible holes could be used in accordance with the demands of the particular system.)

The amplifiers 60–68 are preferably of a bistable nature such that the outputs thereof are either high level or low level signals. That is, if there is a perforation in the tape 16 corresponding to one of the photocells 50–58, to thus in turn excite one of the respective amplifiers, the output of that amplifier is a high level signal. Similarly when there is not a hole present within the tape 16 which corresponds to one of the photocells 50–58 the output of the respective amplifier is a low level signal.

As previously stated, a sprocket hole 40 is provided in each of the rows and in alignment with the data holes 46. Therefore, each time a row of holes is in an operative relationship with the reading head, the output of amplifier 65, which corresponds to the sprocket hole, will be a high level signal. This output is connected by lead 70 to an AND-gate 88. The remaining amplifiers, 60–64 and 66–68, all have their output terminals connected by suitable leads 72 to an eight input OR-gate 74. The output of the OR-gate 74 is connected, via lead 73, to the reset terminal R of a flip-flop 76. The set terminal S of the flip-flop 76 is connected via lead 77 and switch 79 to a source of voltage 78.

Source 78 is capable of providing a momentary voltage pulse which is applied to the S terminal of the flip-flop 76 upon the closing of the switch 79. Switch 79 represents an interlock which may be connected to some physical feature of the transport system associated with the loading of the tape into the system. For example, mechanical linkage may be provided such that the switch 79 is closed upon the performing of some necessary function to load the tape into the system. Such an interlock might consist of a pin or probe which would automatically be depressed upon the loading of the reels onto the panel 10 (FIG. 1). With the application of this voltage to the S terminal of the flip-flop 76, the flip-flop is placed in its set state. In the set state, a low level signal is present at the 0 output terminal of the flip-flop 76. The reset terminal R of the flip-flop 76 is connected to the output of the OR-gate 74. The application of a high level signal to the R terminal will result in a high level signal at the 0 terminal of flip-flop 76.

In addition to being connected to the OR-gate 74, the outputs of the several amplifiers 60, 61, 62, 63, 64, 66, 67 and 68 are connected respectively, via leads 75, to one input of suitable AND-gates 80–87. Each of the AND-gates 80–87 is a two input AND-gate. The second input of each of the AND-gates 80–87 is connected via conductors 70 and 71 to the output of the amplifier 65 which represents the sprocket hole. The 0 output terminal of the flip-flop 76 is connected by conductor 90 to the second input of AND-gate 88. The outputs of the AND-gates 80–87 are connected through suitable leads 92 to a signal utilization means 94. These outputs are in the form of high level or low level signals which respectively represent the presence or absence of a hole in a particular position in the tape 16. The combined configuration of high and low level signals represents a binary coded data character.

The output of the AND-gate 88 is also connected, via lead 95, to the signal utilization means 94. While information is not directly represented by the output of the AND-gate 88, it is this signal which tells the signal utilization means that at that particular time there is information present in the form of a coded signal on the leads 92.

The signal utilization means 94 has been represented as a block inasmuch as the actual structure of this means is not a part of the present invention. That is, the means 94 could be any of a number of possible devices; for example, the memory of a central processor, a different type of storage unit or perhaps this unit might contain suitable decoding and printing circuitry and mechanism to provide a printed record of the data on the tape 16.

The operation of the thus far described apparatus is as follows. Upon the loading of a tape into the system the interlock represented by the switch 79 causes a high level voltage from the source 78 to be applied to the S terminal of flip-flop 76. In this state, there is a low level signal at the 0 output terminal of the flip-flop 76. Having so loaded the tape, the operator now actuates the mechanism by which the tape is caused to be transported past the reading head assembly 26, 28 which contains the light source 48 and the photocells 50–58. During the first or leader portion of the tape, only the sprocket holes are present. Thus there is provided at the output of the amplifier 65 a series of high level signals which are applied to one input of the AND-gate 88. The second input to AND-gate 88 has a low level signal applied thereto by virtue of its connection to the 0 output terminal of flip-flop 76 which, as has been stated, is in the set state. Hence, the output of the AND-gate 88 is a low level signal. This low level signal is transmitted to the signal utilization means 94 and represents to that means that no data is present on the lines 92.

When data first appears on the tape, that is at the time the first data character represented by holes other than the sprocket hole appears beneath in the reading head of the system, one or more of the amplifiers 60, 61, 62, 63, 64, 66, 67 and 68 will have, at the output thereof, a high level signal which is applied to the inputs of the OR-gate 74. The high level signal which results at the output of the OR-gate 74 is applied to the reset terminal R of the flip-flop 76 setting this flip-flop into its reset state. There now exists, at the 0 output terminal of flip-flop 76 a high level signal which is applied to the second input terminal of the AND-gate 88. With a high level signal applied to each of the inputs of the AND-gate 88, the output of AND-gate 88 is also a high level signal. This latter signal is applied via lead 95 to the signal utilization means 94 and represents to the means 94 that a coded data character is present on leads 92.

A further examination of FIG. 3 shows that the outputs of the various amplifiers 60–68, excluding 65, are applied respectively to the AND-gates 80–87. The other inputs of AND-gates 80–87 are connected to the output of amplifier 65. Inasmuch as these terminals are connected to the sprocket hole amplifier 65, which provides a high level signal, it is seen that any of the amplifiers which are in the binary one state due to the existence of an information data hole 46 within the tape may now be gated to the signal utilization means 94 through its corresponding AND-gate 81, 82, 83, 84, 85, 86 or 87. Thus, the requirement that there be information present at the time corresponding to the existence of a sprocket hole synchronizing or timing pulse system is satisfied. It is noted that the flip-flop 76 remains in the reset state until such time as a new tape is loaded into the system to once again actuate the interlock means represented by the switch 79. Thus, once the system has been placed into what may be designated as the information transfer state, the sprocket hole alone may represent a valid coded information character to the signal utilization means. This presents the only restriction on the above described system, namely, that the first data character which appears upon the tape must not be a sprocket hole alone. That is, there must exist, as a first data character on the tape, at least one hole in addition to the sprocket hole in order for the automatic tape start detector of the present invention to function.

Thus it is seen that the present invention provides a system for sensing the beginning of data on a tape and automatically initiating the transmission of signals representing this data. As such, the operator need do nothing more than load the tape into the system and actuate the transport means.

While the principles of the invention have been made clear in illustrative embodiment there will be immediately obvious to those skilled in the art many modifications of structure, arrangement, proportions, and the elements, materials, and components used in the practice of the invention, and otherwise, which are particularly adapted for the specific environments and operating requirements without departing from those principles.

What is claimed is:

1. A perforated tape reading system comprising: an elongated tape having timing and data perforations, signal generating means, responsive to each type of said perforations, for the production of an electrical signal corresponding to each of said perforations; a bistable flip-flop having an input and an output terminal, means including an OR-gate connecting said flip-flop input terminal and said signal generating means corresponding to said data perforations whereby a signal representing a data perforation places said flip-flop into one of its stable states; a signal utilization means; and control means responsive to the concurrence of a signal corresponding to said timing perforations and a signal corresponding to the output of said flip-flop for controlling the transmission of said signals corresponding to said timing perforations.

2. In a perforated tape reading system; an elongated tape having timing and data perforations, said perforations arranged in a series of rows disposed substantially perpendicular to the length of said tape, signal generating means, responsive to each type of said perforations, for the production of an electrical signal correponding to each of said perforations, a bistable flip-flop having an input and an output terminal, means including an OR-gate connecting said flip-flop input terminal and said signal generating means corresponding to said data perforations whereby a signal representing a data perforation places said flip-flop into one of its stable states; a signal utilization means; and control means including an AND-gate responsive to the concurrence of a signal corresponding to said timing perforations and a signal corresponding to the output of said flip-flop for controlling the transmission, to said signal utilization means, of said signals corresponding to said timing perforations.

References Cited

UNITED STATES PATENTS

| | | | |
|---|---|---|---|
| 2,782,398 | 2/1957 | West et al. | 235—61 |
| 3,207,845 | 9/1965 | Swenson | 178—17 |
| 3,067,934 | 12/1962 | Amacher et al. | 235—61 |

MAYNARD R. WILBUR, *Primary Examiner.*

SOL SHEINBEIN, *Assistant Examiner.*

U.S. Cl. X.R.

340—174